UNITED STATES PATENT OFFICE.

PIERRE E. JAY, OF ST. JEAN BAPTISTE, CANADA.

IMPROVEMENT IN THE MANUFACTURE OF CAST-IRON FROM ORE.

Specification forming part of Letters Patent No. 143,350, dated September 30, 1873; application filed March 18, 1873.

*To all whom it may concern:*

Be it known that I, PIERRE EYMARD JAY, of the village of St. Jean Baptiste, in the district of Montreal and Province of Quebec, Dominion of Canada, have invented new and useful Improvements in the Process of Making Cast-Iron from Ore; and I do hereby declare that the following is a full, clear, and exact description of the same.

My invention has reference to further improvements on a certain process for smelting iron ore and flux used therein for which Letters Patent of the United States, No. 134,289, were granted to me on the 24th day of December, A. D. 1872; and consists in treating the iron ore, before being placed in the cupola or furnace, by immersing it in a bath containing a solution of certain substances, or by otherwise thoroughly wetting it with the said solution. These substances are those which have the greatest affinity to carbon, and so the ore thus dipped into or wetted by the solution is enabled to absorb the carbon contained in the flux, and the operation of smelting is performed in a fraction of the time at present usually required for that purpose.

The solution above referred to is prepared as follows: In ten gallons of water dissolve two pounds of sugar. Add two pounds of nitrate of soda, and two pounds of carbonate of lime. Let it stand eight hours, and the mixture is then ready to use.

These proportions will be observed whatever may be the quantity of the solution prepared.

The ore thus dipped in the solution is placed in the cupola with the flux above mentioned, and described in my former patent, and, the blast being turned on, as described, the operation of fluxing the ore is performed in from fifteen to twenty minutes.

What I claim is as follows:

The treatment of iron ore, before being placed in the cupola or furnace, by wetting it with a solution composed of sugar, nitrate of soda, carbonate of lime, and water, in the proportions specified, substantially in the manner and for the purpose described.

Montreal, March 13, A. D. 1873.

P. E. JAY.

Witnesses:
FRAS. HY. REYNOLDS,
R. A. KELLOND.